Nov. 28, 1967  J. E. ASHWORTH  3,355,146
POST PULLING APPARATUS
Filed June 13, 1966 2 Sheets-Sheet 1
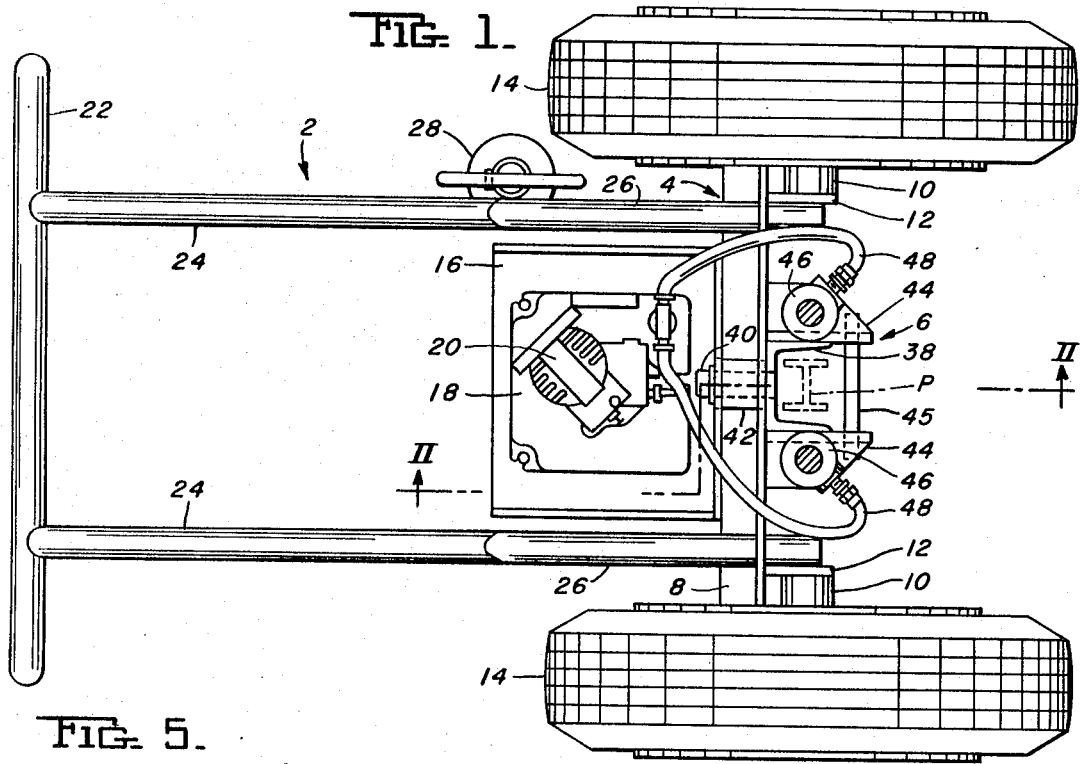
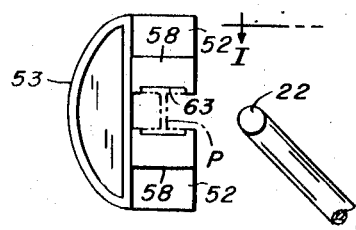
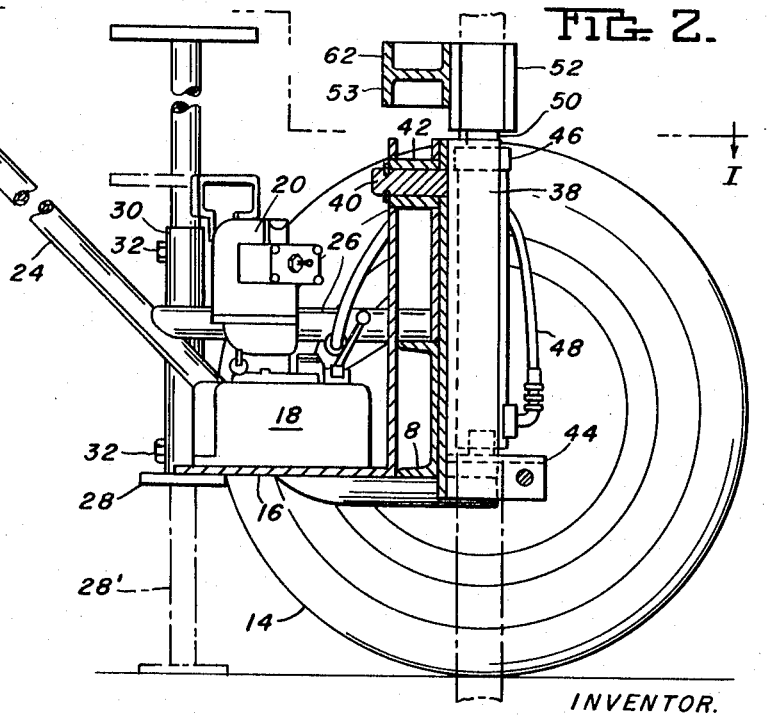
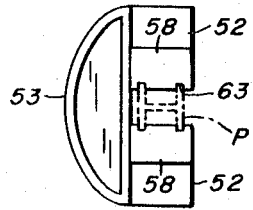
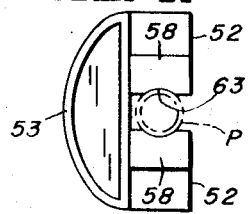
INVENTOR.
JAMES E. ASHWORTH
By Donald G. Dalton
Attorney INVENTOR.
JAMES E. ASHWORTH
By Donald G. Dalton
Attorney 3,355,146
POST PULLING APPARATUS
James E. Ashworth, Moraga, Calif., assignor to United
States Steel Corporation, a corporation of Delaware
Filed June 13, 1966, Ser. No. 557,077
6 Claims. (Cl. 254—29)

ABSTRACT OF THE DISCLOSURE

A post pulling apparatus comprising a frame supported on pneumatic tires, and a hydraulic pressure means that is connected at one end to the frame and is attachable at its other end to the post to be pulled. As the pressure means exerts a greater and greater upward force on the post and a corresponding downward force on the frame and pneumatic tires, the tires are compressed, until the post begins to move upward. Then, the pneumatic tires begin to expand to their original condition and the pressure means and tires work together to pull the post rapidly out of the ground.

---

This invention relates to apparatus for extracting posts, pipes, casings, and other products that are embedded in soil, concrete, or other substances.

In the past, there have existed a number of methods for removing various types of embedded products. These methods have included digging out the substance around the product with a shovel until the product can be easily lifted out, moving the product back and forth laterally until it is loosened from the substance, and loosening the product with a wrecking bar. More sophisticated methods and apparatus have involved the use of hydraulic cylinders which are attached to the product by chains, cables, or other attachment devices. The hydraulic cylinders are planted firmly on the soil or other substance in which the product is embedded, and the pressure in the cylinders is increased until they exert a force on the product that is sufficient to overcome the frictional force holding the product embedded in the substance.

The conventional hydraulic apparatus, while being more sophisticated than the wrecking bar or the shovel, has had a number of disadvantages. Often such apparatus has itself become partially embedded in the substance out of which it is attempting to extract a post or other product. This problem is particularly common with fence post extractors which are often provided with wheels so they can easily be moved from post to post. As the total area of wheel contact of these extractors with the ground is made smaller to increase their mobility, the wheels become more prone to being embedded in the ground during the extraction of a post. This can be a problem even where the post is embedded in concrete since the wheels often have to rest on clay or soil that is covering or is adjacent to the concrete.

Another difficulty of the conventional hydraulic apparatus is that it is not easily adaptable to pulling out posts or other products that are embedded in a solid substance at an oblique angle to the surface of the substance. If an attempt is made to pull such a product out of the substance by a force exerted perpendicular to the surface of the substance, the product may be bent or otherwise damaged and the removal of this product would be extremely difficult.

An object of my invention is to provide apparatus for extracting a variety of products from various types of substances which is mobile and yet is capable of extracting firmly embedded products without embedding its own frame or support means.

Another object of my invention is to provide apparatus that is easily adaptable for extracting products that have been driven into a substance at various oblique angles to the surface of the substance, without bending or distorting such products.

These and other objects will become more apparent from the following description of my invention and the enclosed drawings in which:

FIGURE 1 is a top sectional view of apparatus for extracting fence posts, taken along lines I—I of FIGURE 2;

FIGURE 2 is a side sectional view of the apparatus of FIGURE 1, taken through lines II—II of FIGURE 1 and showing the apparatus attached to a fence post;

FIGURES 5, 6, and 7 are top views of means for attaching the apparatus of FIGURE 1 to posts of various cross-sections.

Figure 3:
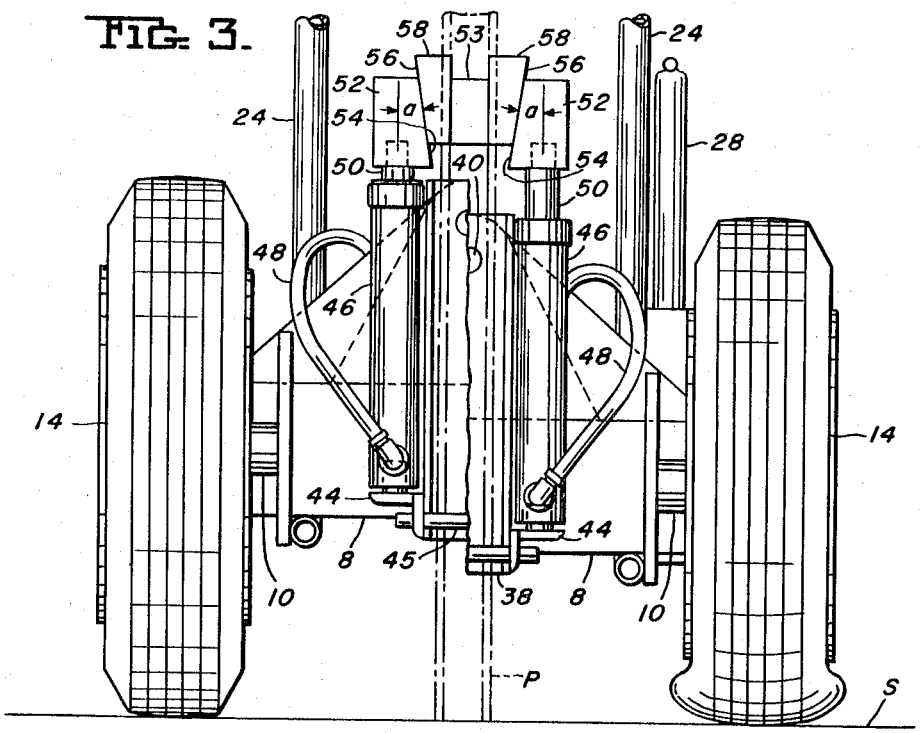
FIGURE 3 is a front elevation of the apparatus of FIGURE 1 showing the right hand side of the apparatus as it would be displaced during the extraction of a post.

Referring to FIGURE 1, apparatus 2 is an embodiment of my invention designed specifically for extracting metal fence posts that are embedded in concrete, clay, soil, or other substances. The apparatus 2 includes a rear frame section 4 and a front frame section 6.

The rear frame section 4 has a channel member 8, seen in cross-section in FIGURE 2, which extends across the width of the apparatus 2 and has axles 10 mounted on either end by means of brackets 12. Rotatably mounted on each axle 10 is a 14-ply, high pressure, high impact aviation type pneumatic tire 14. On the back of frame section 4 is a platform 16 on which is mounted a hydraulic compressor 18, driven by a power supply 20 that may be either a gasoline engine or an electric motor. Behind the platform 16, a handle 22 is provided for pushing the apparatus 2 from fence post to fence post. The handle 22 is mounted on horizontal channel member 8 by tubular columns 24 extending beneath the channel member 8. The columns 24 are reinforced by tubular brace members 26 extending above the member 8.

A support stand 28 is provided to support the rear end of apparatus 2 when the apparatus is not in use. The stand 28 is slidable within a sleeve 30, which is welded to one of the tubular columns 24. Bolts 32 threaded into the sleeve 30 are tightened against the stand 28 to secure the stand in either its lowered, chain-line position 28' or its raised, solid-line position (FIGURE 2).

The front frame section 6 has a vertical channel member 38 that is pivotally mounted on the rear frame section 4. For this pivotal mounting, a pin 40 is secured to the rear of the channel member 38 and rotates within a sleeve 42 on the frame section 4. On either side of the bottom end of channel member 38 are mounted two angle supports 44, best seen in the front view of apparatus 2 in FIGURE 3. A post retaining bar 45 is inserted through holes in supports 44 and is locked in place between the supports 44 during the extraction of a post.

A hydraulic cylinder 46 is mounted on top of each angle support 44, and hoses 48 connect these cylinders to the hydraulic compressor 18. Within the cylinders 46 slide piston rods 50, on which are mounted a pair of wedging members 52. A beam 53, seen from the top in FIGURE 5, connects the wedging members 52 and holds these wedging members a fixed distance apart. As seen in FIGURE 3, the wedging members 52 have downwardly converging surfaces 54. These surfaces are designed to engage converging wedge surfaces 56 on removable wedge blocks 58.

As seen in FIGURE 5, the wedge blocks 58 also have surfaces 63 that are designed to hold a fence post P. The surfaces 63 are of a rough texture to insure high frictional contact with the post P, and they are also grooved to accommodate a particular shape of fence post. Since the wedge blocks 58 are removable, a number of different sets of blocks 58 with differently grooved surfaces 63 may be supplied for use with the same apparatus 2. Examples of three sets of blocks 58, designed for holding posts different shapes, are shown in FIGURES 5, 6 and 7.

By contrast to the rough post engaging surfaces 63 of wedge blocks 58, the downwardly converging surfaces 56 of blocks 58 and their matching surfaces 54 of blocks 52 should be smooth, hardened, and polished. The angles $a$ (FIGURE 3) of these surfaces with the center-lines of the piston rods 50 should be such that a fast, secure gripping action of wedge blocks 58 against post P is obtained when the blocks 52 are raised upward into engagement with the wedge blocks 58. To obtain such a gripping action, it is recommended that the size of each angle $a$ (FIGURE 3) be 8° 30′.

Figure 4:
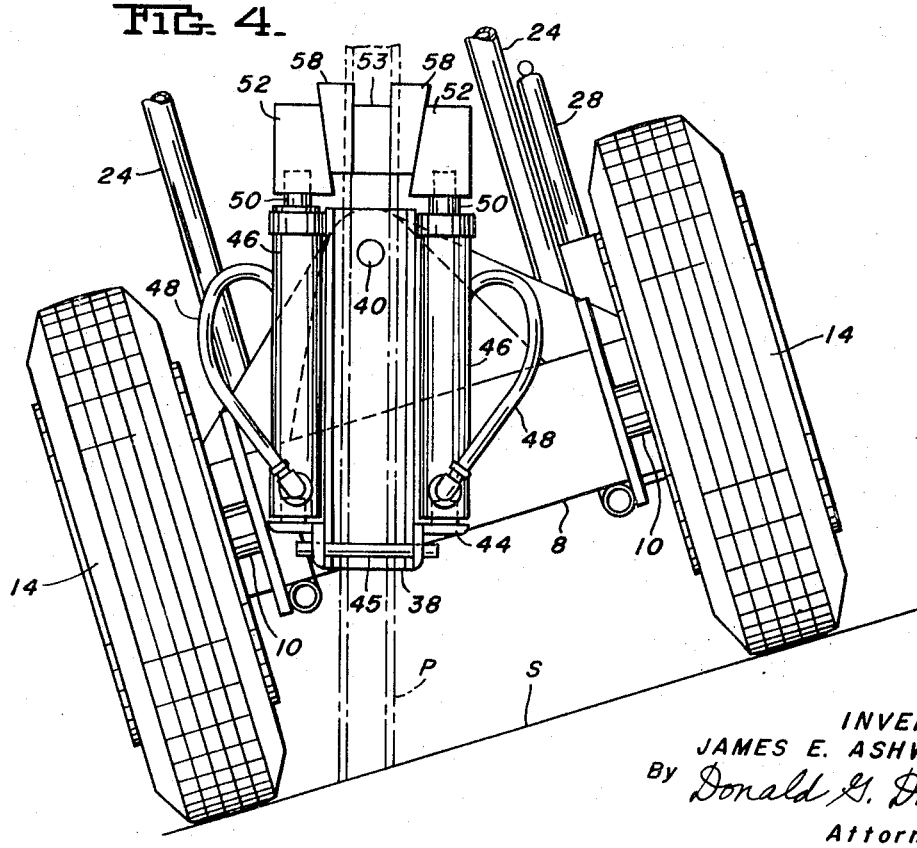
FIGURE 4 is a front view of the apparatus of FIGURE 1, showing the apparatus positioned for removing a vertical post from sloping terrain.

In operation, the apparatus 2 is pushed into position for extracting post P by the operator who pushes on handle 22. With the post retaining bar 45 removed, the apparatus 2 is positioned so that the post P is centrally located between and aligned parallel with the flanges of channel member 38. This positioning is easily accomplished, even where the wheels 14 are not on level ground, since the channel member 38 is pivotally connected to the rear frame section 4 which carries the wheels 14. In FIGURE 4 is shown the positioning of the apparatus 2 on a fence post that is embedded in ground that slopes in a direction parallel with the axis of wheels 14. The channel member 38 may also be aligned with the post P with equal ease when the ground slopes in a direction perpendicular to the axis of the wheels 14, since the entire frame of the apparatus 2 can be rotated about the axles 10 of the wheels 14. Thus, the axles 10 and the pin 40 riding within the sleeve 42 provide a double gimbal mounting for the channel member 38 that permits the channel member to be aligned with a post sloping in any direction from the surface of the ground from which it is to be extracted.

When the post P is aligned with and housed within the walls of channel member 38, the retaining bar 45 is inserted through its holes in angle support 44. When this is accomplished, the apparatus 2 will be prevented from falling backward, since it will be prevented from rotating about axles 10 by post P. Thus, support stand 28 can remain in its raised, solid-line position (FIGURE 2).

With the post P retained in channel member 38 by bar 45, the wedge blocks 58 are set in place, as shown in FIGURE 3. The power supply 20 is then turned on to drive the compressor 18 and force hydraulic fluid into the cylinders 46. The piston rods 50 are thus raised forcing the wedging blocks 52 upwardly against the wedge blocks 58 and squeezing the wedge blocks 58 against opposite sides of the post P. As the compressor 18 continues to pump fluid to build up the pressure in cylinders 46, the pneumatic tires 14 will begin to be compressed against the surface of the substance S in which the post P is embedded. As the tires 14 are compressed, their side walls will bulge outwardly in the areas where the tires contact the surface of the substance S, as illustrated by the right-hand tire 14 in FIGURE 3. This bulging will increase the area of contact of the tires 14 with surface S and will lessen the likelihood of the tires sinking into the soil.

Due to the compression of the tires 14, both the rear frame section 4 and the front frame section 6 will be lowered with respect to the post P and the cylinders 46 will be pushed downward relative to the piston rods 50, attached to post P by wedge blocks 58. This downward movement of the cylinders 46 will continue until the resultant downward force of the pressure in cylinder 46 equals the resultant upward force of the pressure in compressed tires 14. Then, as the compressor 18 continues to pump, the pressure in both the cylinders 46 and the tires 14 will increase until enough upward force is exerted on the piston rods 50 to begin to lift the post P upwardly out of the substance S. While building up this pressure in cylinders 46, the hydraulic compressor should be pumping at a relatively low volume rate of approximately 13 cubic inches per minute, while obtaining a pressure of between 1,000 to 10,000 p.s.i., depending upon how much pressure is needed to extract the post. After the post begins to move upwardly, the compressor should be capable of shifting to a higher volume flow and lower pressure of approximately 150 cubic inches per minute and 50 p.s.i. At this second volume rate and pressure, the tires 14 will be allowed to return to their normal uncompressed state, and will thus aid the hydraulic cylinders 46 in lifting the post P out of the ground once it is initially loosened. When the post P has been lifted to such an extent that there is no ground resistance force holding the post P in the ground, the wedging blocks 52 will cease to grip the wedge blocks 58, and the post P will be instantly released from the apparatus 2. The post retaining bar 45 can then be removed, and the apparatus 2 wheeled away and moved to another post.

It can thus be seen from the foregoing description that apparatus 2 is of a simple, rugged construction, and can be easily operated by one man. It is very mobile and can be moved easily across rough terrain, yet its heavy-duty tires 14 will compress to form a wide, non-sinking support while a post or other product is being extracted. Due to the pivotally connected frame sections 6 and 8, the apparatus 2 can extract a product that is embedded at any angle to the surface of a substance, without bending or otherwise damaging the product. The wedge blocks 58 provide a firm grip on the product while the product is being extracted, yet this grip is released instantly once the extracting operation is complete.

While one embodiment of my invention has been shown and described herein, other modifications will be readily apparent that are within the scope of the appended claims.

I claim:

1. Apparatus for extracting from a solid substance a workpiece having a part thereof embedded beneath the surface of said solid substance, said apparatus comprising:
    a frame;
    two resilient elements mounted on said frame having an area of contact with said surface of solid substance;
    an attachment means secured to said workpiece; and
    a pressure means connected to said attachment means and also connected to said frame at a location above the area of said surface of solid substance between the areas of contact of said resilient elements, said pressure means adapted to exert on said frame a force that is toward said surface of solid substance and on said attachment means a force that is outward from said surface of solid substance,
    said pressure means being capable of moving said connected frame against said resilient elements so as to compress the resilient elements,
    said pressure means also being capable of exerting a force on said attachment means that will initially move said attachment means and secured workpiece outwardly relative to said surface of solid substance,
    and said resilient elements and pressure means together being capable of continuing the outward movement of said workpiece after said pressure elements have compressed said resilient means and initially moved said workpiece.

2. Apparatus of claim 1 wherein said attachment means includes:
    two spaced apart wedge blocks each having a relatively rough surface facing the other block, said rough surfaces adapted for engagement with opposite sides of said workpiece, each of said blocks also having a relatively smooth wedging surface which faces away from the other block and which converges towards the other block in the direction of said surface of said solid substance; and a wedging means mounted on said pressure means and having a pair of spaced apart, relatively smooth, locking surfaces facing towards each other and matching the wedging surfaces of said wedge blocks, said locking surfaces being spaced and positioned so that in reaction to the force of said pressure means they engage said wedging surfaces of said wedge blocks and force said rough surfaces of the wedge blocks into tight, nonsliding engagement with said workpiece.

3. Apparatus of claim 1 in which one of said resilient elements includes a closed pneumatic chamber having a resilient wall bearing upon said surface of solid substance, the area of contact of said resilient wall with said surface of solid substance increasing as said resilient means is compressed by said pressure means.

4. Apparatus of claim 3 wherein said pneumatic chamber is a high-strength rubber tire that is rotatably mounted on said frame so as to act as a wheel that facilitates transport of said apparatus over said substance.

5. Apparatus of claim 4 wherein said frame includes two sections pivotally connected to each other about an axis perpendicular to the axis of rotation of said wheel and also perpendicular to the direction of said force exerted by said pressure means, said pressure means being mounted on one of said frame sections and said resilient means being mounted on the other of said frame sections.

6. Apparatus of claim 1 wherein said pressure means includes:

a hydraulic cylinder;

a piston and connected rod slidably mounted within said cylinder;

means for flowing hydraulic fluid through said cylinder to move said rod outwardly from said cylinder; and means for varying the pressure of said fluid against said piston.

References Cited
UNITED STATES PATENTS

| | | | |
|---|---|---|---|
| 1,055,790 | 3/1913 | Paul et al. | 254—30 |
| 1,435,486 | 11/1922 | Leon et al. | 254—30 |
| 1,543,123 | 6/1925 | Renari | 254—31 |
| 2,940,267 | 6/1960 | Shaver | 254—29 XR |
| 3,129,924 | 4/1964 | Froh. | |

MILTON S. MEHR, *Primary Examiner.*